Aug. 4, 1931.  C. F. COOKSON  1,817,351
COOKING DEVICE
Filed March 5, 1929
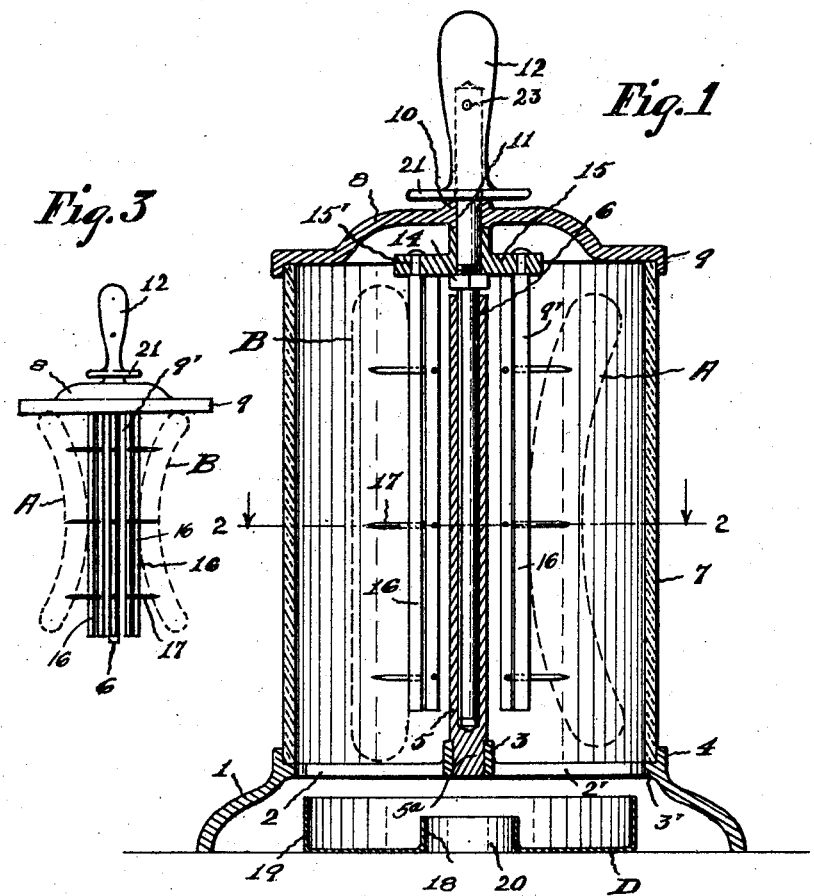
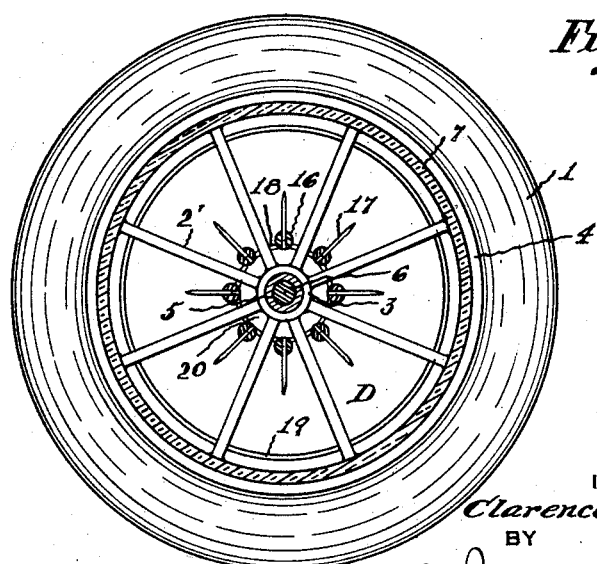
INVENTOR
Clarence F. Cookson
BY
Harold D. Penner, ATTORNEY Patented Aug. 4, 1931

1,817,351

UNITED STATES PATENT OFFICE

CLARENCE F. COOKSON, OF LYNDHURST, NEW JERSEY, ASSIGNOR TO COUNTER COOK-
ING MACHINE CORPORATION, OF NEW YORK, N. Y., A CORPORATION OF DELA-
WARE

COOKING DEVICE

Application filed March 5, 1929. Serial No. 344,210.

My present invention relates to a cooking utensil and has for its specific purpose the provision of an enclosed cooking device for cooking, toasting or roasting Frankfurters, sausages and the like.

One object is to provide an improved spit so that such food products as above enumerated may be readily handled while hot by taking the hot, cooked products directly from the spit onto a split roll of bread, the spit being preferably affixed to the cover and removable therewith.

Further objects are to provide a cooker which may be used over a gas burner, or any desired separate heating source, with a separate means to catch all grease that may flow during the cooking or toasting operation from the product subject to heat for roasting in the device.

A further object is to enhance the advertising value of the device by providing a transparent outer container, in the present instance of cylindrical form, made of heat proof glass whereby the progress of the roasting of the product may be observed, to obtain a proper degree of cooking, and the device easily kept sanitarily clean and attractive.

These and other capabilities will be apprehended as the herein description proceeds, and it is obvious that modifications may be made in my device without departing from the spirit thereof or the scope of the appended claims.

In the drawings:

Fig. 1 is a longitudinally sectional view of my device.

Fig. 2 is a transverse sectional view taken on the line 2—2, Fig. 1, looking in the direction of the arrows.

Fig. 3 is a side view of the multiple spit.

The device comprehends a shell like base 1, having a bell-shaped contour, encompassing a centrally disposed opening, with an integral spider portion 2 in said opening, the arms 2' of said spider radiate from a central shell 3 and merge into the bottom edge 3' of a rabbetted rim 4. The shell 3 receives and fixedly supports centrally of the device a tubular member 5, which has thereon at the lower end thereof a solid part 5ª; said part 5ª serves as a pivot bearing and the tubular member 5 acts as a sheath and socket, to revolvably receive and support a pilot stem 6 of the removable spit, which is broadly denoted by 9', as shown in Figs. 1 and 3, and is hereinafter described in detail.

The rabbetted rim 4 loosely supports a cylindrical casing 7 of transparent material, such as glass, which is removably mounted on said base 1, to permit occasional cleaning. The casing being transparent, it permits the inspection of the products enclosed thereby during the operation of cooking or toasting.

A cover 8, of metal, similar to the base, has a somewhat flaring bell-shaped outline and is provided with an annular depending flange 9 to encompass the outer upper portion of the glass cover 7 loosely, so as to be easily removable and replaceable, as desired. The cover is provided with a centrally disposed hub 10, having therein a bore 11 to receive therein the upper end of a central stem 6 of the spit 9', the upper extension of said stem 6 being attached to the interior of the handle 12 preferably by the removable pin 23. Normally, flange 21 of the handle abuts the raised hub portion 10 of the cover.

The stem portion, situated below the handle 12 and passing through said bore 11, is slightly reduced from the portion, which is enclosed by said handle 12, and part of said stem portion is threaded to receive thereon a nut 14, which serves to hold on said stem portion a horizontally disposed disk 15, which is mounted to be rotated coaxially with said casing 7 and is drilled near the outer periphery thereof to form a plurality of holes 15', to which are connected by riveting the upper ends of a plurality of vertically disposed rods 16, which are positioned in radial planes and serve as holders for spits 17.

Eight of these rods are shown as provided and each in turn is provided with a plurality of outstanding spit pins 17 which are sharpened on their outer ends and being in radial alinement relative to the device proper, and in vertical alinement with each other on their individual rods, they form a series of alined spit points upon which may be impaled and mounted in either curved or straightened positions, a plurality of frankfurters A—B, Figs. 1 and 3. Thus, each rod is provided with three said pins to hold a Frankfurter in desired cooking position, as illustrated, and eight or less may be toasted at one time. Of course, any preferred number of rods 16 may be secured to the disk or spider 15, and any suitable number of spits may be secured to each rod.

When the food is done the cover and spit may be bodily removed from the device, as shown in Fig. 3, and slices of bread or a split bread roll may be used as a pair of tongs to remove the cooked article. This device is capable of cooking or toasting whole potatoes and similar articles of food.

In use, the device may be placed over an ordinary gas burner, with an annular drip pan D of the form shown in Fig. 1, in section, and the heat turned on the spitted food. The heat rises readily into the interior of the device and as any grease or condensed volatile vapors flow out they are caught in the drip pan D. The pan D is made of sheet metal having an inner rim 18 and an outer rim 19, there being a passage 20, in the center of said pan D, whereby to permit the heat of the burner to rise steadily thereby, and up into the cooking interior of the casing 7.

Thus it will be seen that I have provided a cleanable, attractive and sanitary cooking utensil which permits of constant inspection of the food while cooking, and thereby aids in preventing impairment of the food through being overdone or underdone, and enhances the food so cooked.

Where a plurality of these devices are simultaneously in use at resorts, the sale value of such exposed cooking devices is great and stimulate sales, for prospective customers can observe the sanitary process of roasting and said process permits one operator to tend a large number of such devices with little food spoilage.

It is to be understood that the apparatus herein disclosed is merely suggestive of a type of apparatus that may be employed in carrying out the new method of operation, it being understood that any other apparatus of different construction and arrangement of elements may be employed within the spirit and scope of the invention.

I claim:

1. In a cooking device a cylindrical casing, a rotatably mounted member, pivotally connected to said casing coaxially therewith, one or more holders for spits, connected to said member, one or more series of spits, secured to said holders, to be rotated therewith and said member around the axis of said casing, a centrally disposed opening at the bottom of said casing, for the ingress of heat therethrough to said spits, and an annular drip pan, having therein a centrally disposed passage positioned under said opening, for catching the drippings from food on said spits, and said passage to permit the ingress of heat therethrough and through said opening to said spits.

2. In a cooking device a cylindrical casing, a base thereunder, a spider on said base, centrally thereof, a pivot bearing on said spider, a stem, pivotally connected to said casing and rotatably supported by said bearing coaxially with said casing, a horizontally disposed member on said stem, one or more vertically disposed holders for spits, connected to said member, and one or more series of spits, secured to said holders, to be rotated therewith and said member around the axis of said casing.

3. In a cooking device a casing of transparent material, a removable cover thereon, a base having thereon a rabbetted seat for supporting said casing, an opening in said base, for the ingress of heat therethrough to the interior of said casing, one or more holders for spits, connected to said cover, and one or more series of spits, secured to said holders, said holders with said spits thereon being removable with said cover from said casing.

4. In a cooking device a cylindrical casing, a removable cover thereon, a base thereunder, a spider on said base, centrally thereof, a pivot bearing on said spider, a centrally disposed hub on said cover, said hub having therein a central bore, a stem, having its upper end swivelled in said bore, thereby being pivotally connected to said cover at said hub, said stem being rotatably supported by said bearing, a horizontally disposed disk, secured to the upper end of said stem at said hub, interiorly of said cover, a handle on said stem exteriorly of said cover, one or more vertically disposed holders for spits, connected to said disc, and one or more series of spits, secured to said holders, to be rotated therewith and said disk by means of said handle around the axis of said casing.

5. In a cooking device a cylindrical casing of transparent material, a removable cover thereon, a horizontally disposed disk in said casing, pivotally connected to said cover, one or more vertical series of horizontally disposed spits, connected to said disk interiorly of said casing, a handle, positioned exteriorly of said casing, and a member, passing through said cover and secured to said disk and said handle, thereby rigidly connecting said disk and said handle to each other, said member being swivelled in said cover, thereby pivotally connecting said disk with said handle to said cover and thereby providing a means for rotating said spits in said casing.

6. In a cooking device, a cylindrical casing, a removable cover thereon, a base thereunder, a spider on said base, centrally thereof, a pivot bearing on said spider, a vertically disposed tubular member, forming an upwardly extending sheath or socket, on said bearing, a centrally disposed hub on said cover, said hub having therein a central bore, a stem encompassed by said sheath and socket, and revolvably supported thereby, said stem having its upper end swivelled in said bore, thereby being pivotally connected to said cover at said hub, and said stem having its lower end rotatably supported by said bearing, a horizontally disposed disk, secured to the upper end of said stem at said hub, interiorly of said cover, a handle on said stem, exteriorly of said cover, one or more vertically disposed holders for spits, connected to said disk, and one or more series of spits, secured to said holders, to be rotated therewith and said disk by means of said handle around the axis of said casing.

Signed at Lyndhurst, in the county of Bergen and State of New Jersey this 23rd day of February, A. D. 1929.

CLARENCE F. COOKSON.